United States Patent

Sawada et al.

Patent Number: 5,167,860
Date of Patent: Dec. 1, 1992

[54] LIQUID CRYSTAL COMPOSITION

[75] Inventors: Shinichi Sawada; Akiko Fukuda, both of Chiba, Japan

[73] Assignee: Chisso Corporation, Osaka, Japan

[21] Appl. No.: 573,140

[22] PCT Filed: Feb. 9, 1990

[86] PCT No.: PCT/JP90/00156
§ 371 Date: Sep. 19, 1990
§ 102(e) Date: Sep. 19, 1990

[87] PCT Pub. No.: WO90/09419
PCT Pub. Date: Aug. 23, 1990

[30] Foreign Application Priority Data

Feb. 14, 1989 [JP] Japan .................................. 1-34224
Aug. 22, 1989 [JP] Japan .................................. 1-215793

[51] Int. Cl.⁵ ..................... C09K 19/30; C09K 19/52; C09K 19/12
[52] U.S. Cl. ........................... 252/299.63; 252/299.66; 252/299.6; 252/299.01
[58] Field of Search ..................... 252/299.63, 299.66

[56] References Cited

U.S. PATENT DOCUMENTS

| | | | |
|---|---|---|---|
| 4,510,069 | 4/1985 | Eidenschink et al. | 252/299.61 |
| 4,551,264 | 11/1985 | Eidenschink et al. | 252/299.62 |
| 4,606,845 | 8/1986 | Romer et al. | 252/299.63 |
| 4,695,131 | 9/1987 | Balkwill et al. | 350/350 R |
| 4,695,398 | 9/1987 | Goto et al. | 252/299.5 |
| 4,822,519 | 4/1989 | Saito et al. | 252/299.61 |
| 4,846,998 | 7/1989 | Pohl et al. | 252/299.63 |

FOREIGN PATENT DOCUMENTS 0256636 2/1988 European Pat. Off.
0280902 9/1988 European Pat. Off.

Primary Examiner—Robert L. Stoll
Assistant Examiner—C. Harris
Attorney, Agent, or Firm—Leydig, Voit & Mayer

[57] ABSTRACT

A liquid crystal composition is provided which includes, as main components, 15 to 80 parts by weight of at least one compound represented by the formula (I)

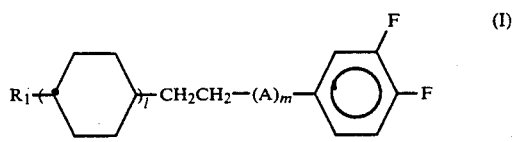

and 25 to 65 parts by weight of at least one compound represented by the formula (II)

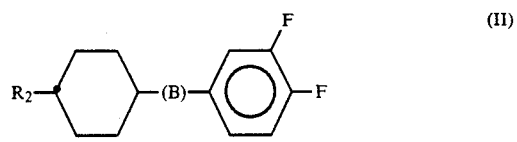

wherein $R_1$ is an alkyl group having 1 to 10 carbon atoms, $R_2$ is an alkyl group having 1 to 10 carbon atoms, $l$ is an integer of 1 or 2, $m$ is an integer of 0 or 1, but $l+m=2$, and A and B are independently

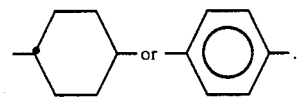

15 Claims, 2 Drawing Sheets

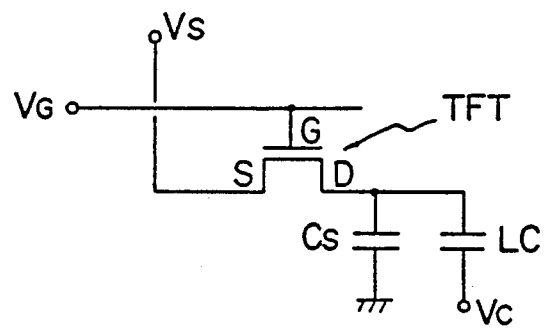
F I G. 1
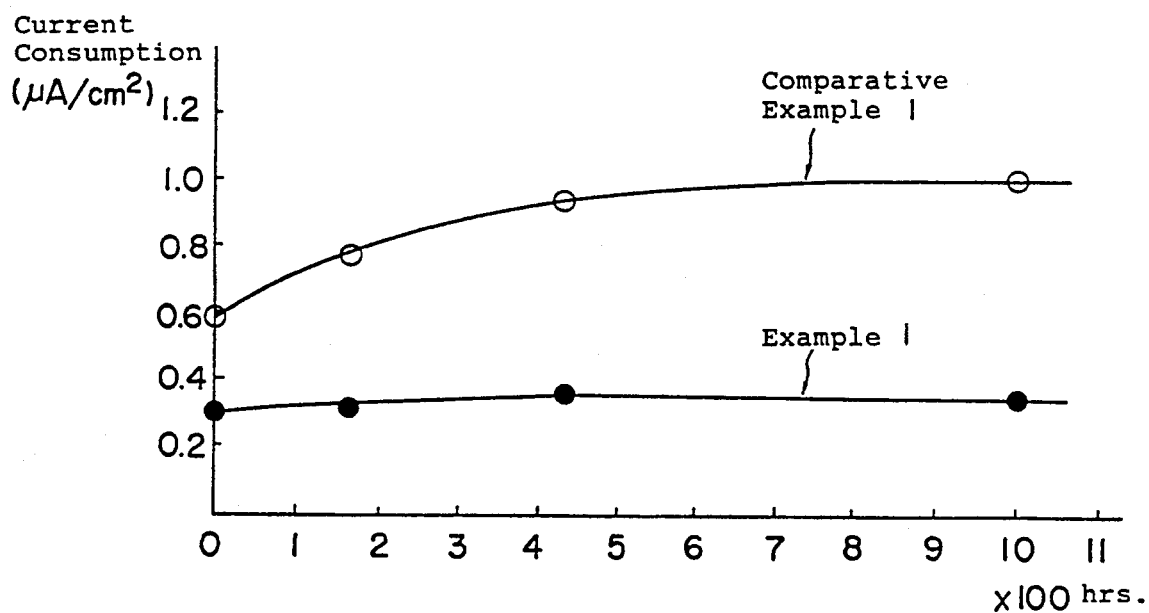
F I G. 2

LIQUID CRYSTAL COMPOSITION

TECHNICAL FIELD

The present invention relates to a liquid crystal composition for liquid crystal display elements and a liquid crystal display element containing this composition. More specifically, the present invention relates to a nematic liquid crystal composition for passive mode and active matrix mode liquid crystal elements which require a high reliability and a liquid crystal element containing this composition.

BACKGROUND ART

Liquid crystal compositions are used in conventional passive mode liquid crystal elements such as 90° twisted nematic mode, guest/host mode, supertwisted mode and SBE mode liquid crystal elements and in active matrix mode liquid crystal elements, for example, a nonlinear two-terminal element such as a diode and a three-terminal element such as a thin film transistor (hereinafter referred to as "TFT" on occasion) as switching elements, and each of these liquid crystal compositions is a mixture which is used so as to cause a compound having a CN group on a terminal or a side chain to exhibit a positive or a negative dielectric anisotropy (hereinafter referred to as "$\Delta\epsilon$" on occasion). In this connection, when induced by the CN group on the terminal, the dielectric anisotropy is largely positive; and when induced by the CN group on the lateral chain the dielectric anisotropy is largely negative. For example, in the case of the 90° twisted nematic mode liquid crystal display element which occupies most of the commercially available liquid crystal elements, a threshold voltage $V_c$ regarding voltage-capacitance characteristics can be represented by the following formula containing a dielectric anisotropy: $\Delta\epsilon$, and Frank's elastic constants, $K_{11}$, $K_{22}$ and $K_{33}$:

$$V_c = \pi\sqrt{\frac{K_{11} + (K_{33} - 2K_{22})/4}{\epsilon_0 \Delta\epsilon}}$$

Therefore, it is effective in decreasing the threshold voltage $V_c$ that the liquid crystal element contain a compound having a positive and large $\Delta\epsilon$, i.e., a compound having the CN group at a terminal as a constitutional component of the composition. In addition, the value of $\Delta\epsilon$ has an influence on the threshold voltage $V_c$. That is, the larger the $|\Delta\epsilon|$ is, the smaller the value of the threshold voltage $V_c$ is. In consequence, the conventional liquid crystal composition permits driving the liquid crystal display element at a low voltage, e.g., several volts by adjusting the content of the compound having the CN group at the terminal or the lateral in the above-mentioned system, which is the greatest feature of the liquid crystal display element.

In recent years, the enlargement of the application range of the liquid crystal display elements has led to the requirement of the liquid crystal composition of the passive mode displays, active matrix mode displays and the like having a high reliability of a small electric current consumption, a high specific resistance and the like as well as the requirement of the liquid crystal element having a high display contrast.

However, a group having a strong polarity such as the CN group contributes to the occurrence of the above-mentioned dielectric anisotropy, but it is undesirable in the electric current consumption, the specific resistance and the display contrast. This reason is not elucidated apparently even by a person skilled in the art, but the present inventors presume that the CN group at the terminal or on the lateral chain would interact somewhat with ionic impurities present in the display element and have a bad influence on the electric current consumption, the specific resistance and the display contrast. Drawbacks of a compound having a CN group are as follows: In the case of the passive mode element, the reliability deteriorates. That is, the electric current consumption increases and specific resistance lowers, and with regard to the display characteristics, irregularity in the contrast of the display and decline of the contrast tend to take place Furthermore, in the case of the active display element, the deterioration of the reliability is more noticeable than in the case of the passive display element under the influence of a drive current of a two-terminal or three-terminal switching element, which leads to an increase of the electric current consumption and the decline in the specific resistance. In particular, this decline in the specific resistance further brings about a secondary bad influence such as the deterioration of contrast of the active matrix displays.

For example, the contrast of the TFT display element shown in FIG. 1 is closely connected with its signal voltage holding ratio. The signal voltage holding ratio denotes the degree of the drop of the signal voltage applied to a TFT picture element containing the liquid crystal in a prescribed frame cycle. Therefore, when a drop of the signal voltage is not present, deterioration of the contrast does not occur. Furthermore, the signal voltage holding ratio synergistically deteriorates, as the capacitance of a capacitor ($C_s$) disposed in parallel with the liquid crystal and the specific resistance of the liquid crystal (LC) decrease. In particular, when the specific resistance of the liquid crystal falls below a certain lower limit, the voltage holding ratio deteriorates exponentially, which case leads to an extreme decline in the contrast. Particularly when any storage capacitance ($C_s$) is not added, on account of the simplification of a TFT manufacturing process or the like, a liquid crystal composition having a fairly high specific resistance is necessary, because a contribution of the storage capacitance cannot be expected.

As discussed above, in order to ensure high reliability and high contrast in the passive and the active mode liquid crystal elements, a liquid crystal composition involving a small current consumption and having a high specific resistance is required.

An object of the present invention is to provide a liquid crystal composition involving a small current consumption and having a high specific resistance as described above, i.e., having a high reliability, and another object of the present invention is to provide a liquid crystal display device using the above-mentioned liquid crystal composition and having high reliability and high display contrast.

DISCLOSURE OF INVENTION

A liquid crystal composition of the present invention is characterized by containing a compound represented by the formula (I)

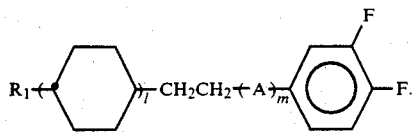 (I)

More specifically, an extreme liquid crystal composition of invention is as follows:

(1) A liquid crystal composition mainly comprising 15 to 80 parts by weight of a compound represented by the formula (I) and 25 to 65 parts by weight of a compound represented by the formula (II)

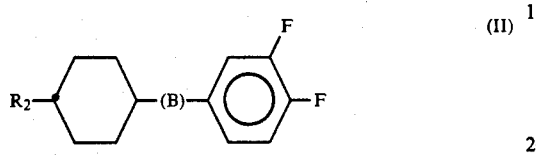 (II)

and preferably containing not less than 60%, more preferably not less than 70% of the compounds represented by the formulae (I) and (II).

(2) A liquid crystal composition comprising 15 to 80 parts by weight of a compound represented by the formula (I) and 10 to 40 parts by weight of at least one compound represented by the formula (III)

$$R_3-(C)_p-X-(D)_q-R_4 \quad (III)$$

and preferably containing not less than 20%, more preferably not less than 30% of the compounds represented by the formulae (I) and (III).

(3) A liquid crystal composition comprising 15 to 80 parts by weight of at least one compound represented by the formula (I), not more than 65 parts by weight of at least one compound represented by the formula (II) and not more than 40 parts by weight of at least one compound represented by the formula (III), and preferably comprising 15 to 80 parts by weight of the compound having the formula (I), 25 to 65 parts by weight of the compound having the formula (II) and 10 to 40 parts by weight of the compound having the formula (III), and containing not less than 60% of the compounds represented by the formulae (I), (II) and (III).

(4) A liquid crystal composition described in the preceding paragraph (1), (2) or (3) containing 5 to 30% by weight of at least one compound represented by the formula (IV)

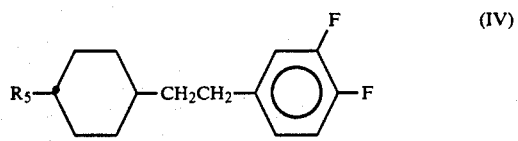 (IV)

and/or at least one compound represented by the formula (V)

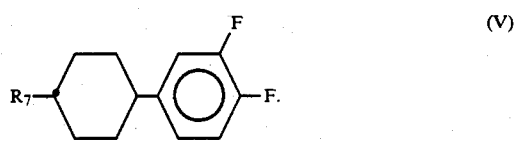 (V)

Furthermore, the present invention is also directed to a liquid crystal display element containing the liquid crystal composition described in the preceding paragraph (1), (2), (3) or (4).

In the above-mentioned formulae (I) to (V), each of $R_1$, $R_2$, $R_5$ and $R_7$ is an alkyl group having 1 to 10 carbon atoms, $R_3$ is an alkyl group having 1 to 10 carbon atoms or an alkoxymethyl group having 2 to 10 carbon atoms, $R_4$ is an alkyl group or an alkoxy group having 1 to 10 carbon atoms, the symbol l is an integer of 1 or 2, m is an integer of 0 or 1, but l+m=2, each of p and q is an integer of 1 or 2, but p+q≦3, each of A, B, C and D is

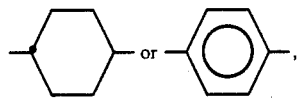

and X is a single bond, —CH$_2$CH$_2$—, —COO— or —C≡C—.

Each compound constituting the liquid crystal composition of the present invention will be described as follows:

Examples of the compound represented by the formula (I) of the present invention include the following compounds:

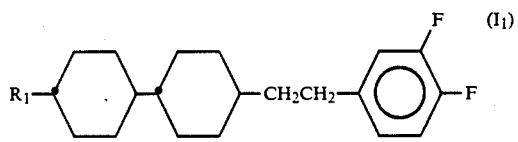 (I$_1$)

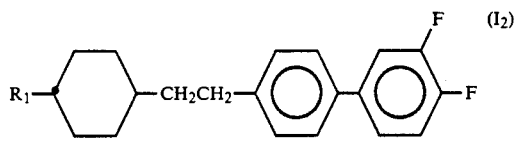 (I$_2$)

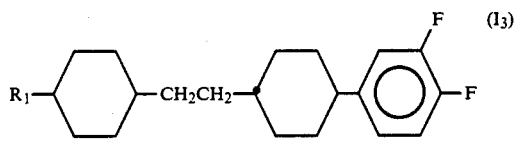 (I$_3$)

Reference to these compounds will be made. Compounds in which $R_1$s of the formula (I$_1$) were alkyl groups having 2 carbon atoms, 3 carbon atoms and 5 carbon atoms were mixed at a weight ratio of 1:1:1 in order to prepare a composition (hereinafter referred to as "A$_1$"). Similarly, compounds in which $R_1$s of the formula (I$_2$) were alkyl groups having 2, 3 and 5 carbon atoms were mixed at a weight ratio of 1:1:1 in order to prepare a composition (hereinafter referred to as "A$_2$"). Moreover, compounds in which $R_1$s of the formula (I$_3$) were alkyl groups having 2, 3 and 4 carbon atoms were mixed at a weight ratio of 1:1:1 in order to prepare a composition (hereinafter referred to as "A$_3$"). Each of the three compositions A$_1$, A$_2$ and A$_3$ was then mixed with a commercial cyclohexanebenzonitrile liquid crystal Zli-1083 (made by E. Merck AG) (hereinafter referred to simply as "commercial liquid crystal 83") in order to prepare mixtures A$_1$(P), A$_2$(P) and A$_3$(P). Physical properties of these mixtures are set forth in Table 1.

As is apparent from extrapolated values in Table 1, i.e., positive dielectric anisotropies of from 4.1 to 7.8, high clearing points of from 67.0 to 102.8° C, and low viscosities of from 24.3 to 32.2 cp in spite of the tricyclic materials, the above-mentioned mixtures mutually exhibit common physical properties.

TABLE 1

|  | A₁(P) | A₂(P) | A₃(P) | Commercial Liquid Crystal |
|---|---|---|---|---|
| Mixture (pts. wt.) | | | | |
| A₁ | 80 | 0 | 0 | 0 |
| A₂ | 0 | 80 | 0 | 0 |
| A₃ | 0 | 0 | 80 | 0 |
| Commercial Liquid Crystal 83 | 20 | 20 | 20 | 100 |
| Characteristics | | | | |
| Melting Point Mp (°C.) | <−30 | <0 | <0 | |
| Clearing Point NI (°C.) | 92.7 (102.8) | 64.1 (67.0) | 86.4 (94.9) | 52.3 |
| Viscosity (20° C.) (η₂₀) (cp) | 25.5 (26.4) | 23.8 (24.3) | 30.1 (32.2) | 21.9 |
| Refractive Anisotropy Δn | 0.111 (0.107) | 0.124 (0.123) | 0.076 (0.063) | 0.128 |
| Dielectric Anisotropy Δε | 8.4 (7.8) | 6.3 (5.2) | 5.4 (4.1) | 10.7 |

The values in parentheses are the extrapolated values.

Table 2 shows crystal-nematic transition points [CN (° C.)] and nematic-isotropic transition points, i.e., clearing points [(NI (° C.)] of each eutectic composition (which is derived from Schröder-Van Laar's formula) comprising the three components of the formulae A₁, A₂ and A₃ according to DSC. A₁(E) is a eutectic composition comprising compounds at a ratio of 30.3:52.9:16.8 in which R₁s of the formula (I₁) are alkyl groups having 2 carbon atoms, 3 carbon atoms and 5 carbon atoms. Similarly, A₂(E) is a eutectic composition comprising compounds at a ratio of 64.6:24.9:10.5 in which R₁s of the formula (I₂) are alkyl groups having 2 carbon atoms, 3 carbon atoms and 5 carbon atoms. Furthermore, A₃(E) is a eutectic composition comprising compounds at a ratio of 53.2:21.7:25.1 in which R₁s of the formula (I₃) are alkyl groups having 2 carbon atoms, 3 carbon atoms and 5 carbon atoms.

As is apparent from Table 2, the compound represented by the formula (I) can have a wide liquid crystal temperature range, even when a small number of components, i.e., three components, are used.

TABLE 2

|  | A₁(E) | A₂(E) | A₃(E) |
|---|---|---|---|
| CN (°C.) | <−10 | 6.1 | −4.0 |
| NI (°C.) | 107.5 | 70.6 | 87.7 |

Examples of the compound represented by the formula (II) of the present invention include compounds having the following formulae:

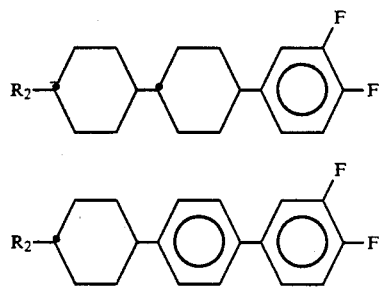

Reference to these compounds will be made. Compounds in which R₂s of the formula (II₁) were alkyl groups having 2 carbon atoms, 3 carbon atoms and 5 carbon atoms were mixed with one another at a weight ratio of 1:1:1, and the resulting mixture was then dissolved in the commercial liquid crystal 83 so as to have a concentration of 80% by weight. Physical properties of the solution are set forth in Table 3. As is apparent from the extrapolated values in Table 3, the solution has a positive dielectric anisotropy of 5.8, a high clearing point of 105.4° C., a melting point of −30° C. or less which means a wide liquid crystal temperature range, and a low viscosity of 21.6 cp in spite of the tricyclic material.

TABLE 3

| Mp (°C.) | <−30 |
|---|---|
| MI (°C.) | 94.8 (105.4) |
| η₂₀ (cp) | 21.7 (21.6) |
| Δn | 0.085 (0.074) |
| Δε | 6.8 (5.8) |

The values in parentheses are the extrapolated values.

The compounds represented by the formula (III) of the present invention include compounds having the following formulae:

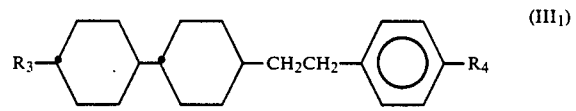

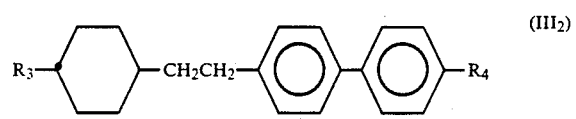

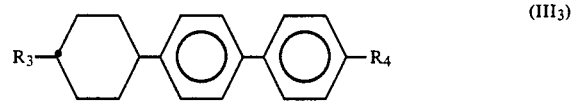

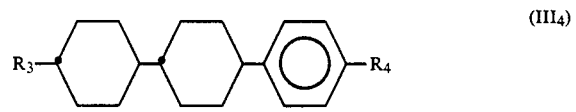

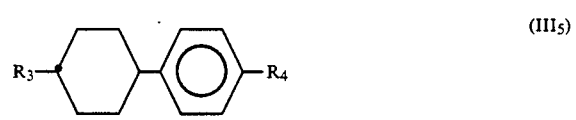

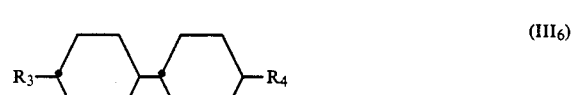

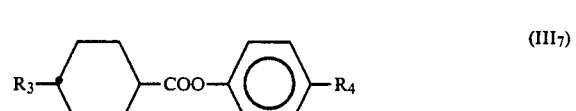

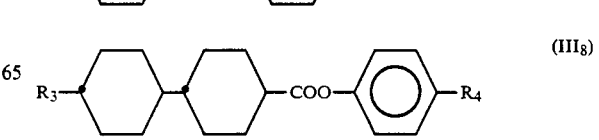

-continued

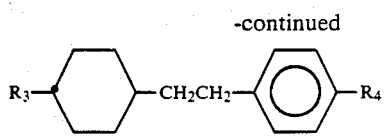  (III₉)

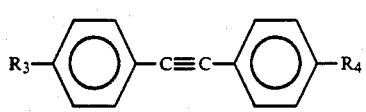  (III₁₀)

The feature of these compounds reside in that their dielectric anisotropies are negative or weakly positive in contrast to compounds each having a CN group. In particular, most of the compounds, each having F at the terminal thereof, have weakly positive values. For example, when an AC voltage (V) having a frequency (f) is applied to a TN system liquid crystal display element having a capacity (C), a consumed current for information display can be represented by the following formula:

$$i = 2\pi f \cdot C \cdot V \circ C. \ 2\pi f \cdot \Delta\epsilon \cdot V$$

because the capacity (C) is proportional to a dielectric constant and the latter is proportional to a dielectric anisotropy ($\Delta\epsilon$). Accordingly, compounds of formula (III) having a negative or weakly positive dielectric anisotropy weaken the strongly positive dielectric anisotropy caused by the mixed compound of the formula (I) or (II), when mixed with the latter, so that the consumed current is decreased. Furthermore, as will be elucidated from the undermentioned examples, compounds of formula (III) largely contributes to not only a decrease of the consumed current but also to the enhancement of the specific resistance. In practice, the proper content of compounds having formula (III) in the composition of the present invention is not more than 40% by weight in view of the rise of the threshold voltage and the like owing to the addition of such compound.

Reference will be made to the compounds represented by the formulae (IV) and (V)

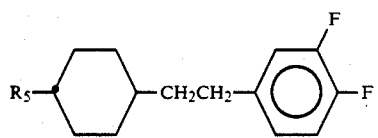  (IV)

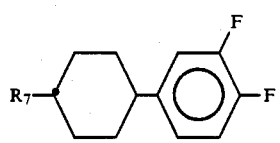  (V)

of the present invention. Compounds in which R₅ and R₇ of the formulae (IV) and (V) were alkyl groups having 5 carbon atoms were each dissolved in the commercial cyclohexanebenzonitrile liquid crystal Zli-1132 (made by E. Merck AG) (hereinafter referred to simply as "commercial liquid crystal 32") so as to be a concentration of 15% by weight, thereby preparing mixtures IV(P) and V(P). Physical properties of these mixtures are set forth in Table 4. As is apparent from Table 4, both of these components have common physical properties such as a positive dielectric anisotropy of 11.0 and a large viscosity reduction effect. In practice, the proper content of each of these compounds in the composition of the present invention is 30% by weight or less in view of the drop in clearing point and the like owing to the addition of the compound.

TABLE 4

|  | IV(P) | V(P) | Commercial Liquid Crystal 32 |
|---|---|---|---|
| Mp (°C.) | <−20 | <−20 |  |
| NI (°C.) | 54.5 | 53.7 | 72.4 |
| η₂₀ (cp) | 21.7 | 21.1 | 27.0 |
| Δn | 0.118 | 0.116 | 0.137 |
| Δε | 11.0 | 11.0 | 11.0 |

For the purpose of adjusting threshold voltage regarding voltage-transmittance properties, liquid crystal temperature range, refractive anisotropy, dielectric anisotropy, viscosity and the like, the liquid crystal composition of the present invention may contain a liquid crystal compound or a liquid crystal-like compound other than the compounds represented by the formulae (I) to (V) in such an amount as not to impair the object of the present invention in compliance with the use of the liquid crystal display element using the liquid crystal composition. Examples of such an additional compound are as follows:

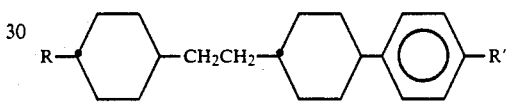

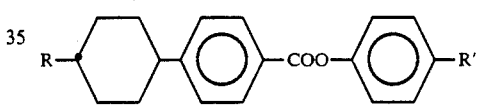

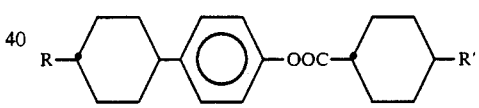

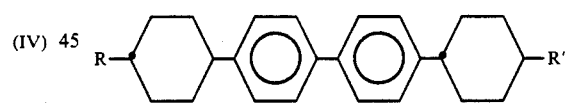

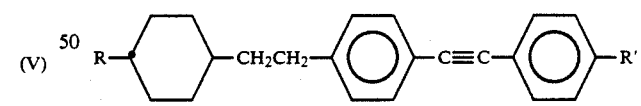

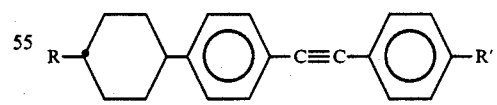

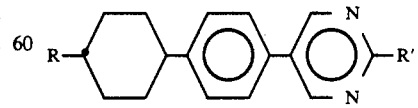

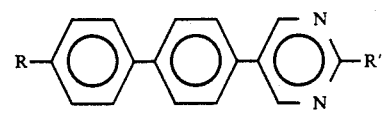

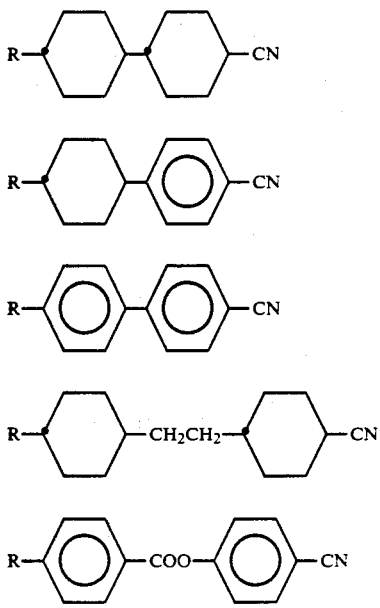

(wherein each of R and R' is an alkyl group, an alkoxy group or F).

As will be elucidated by the undermentioned examples, the liquid crystal composition of the present invention has features such as a low current consumption, a high specific resistance, a low viscosity and a proper positive dielectric anisotropy as well as a high. Accordingly; it can provide a liquid crystal display element having a high contrast.

BRIEF DESCRIPTION OF DRAWINGS

FIG. 1 shows an equivalent circuit of a TFT display element.

Figure 3:
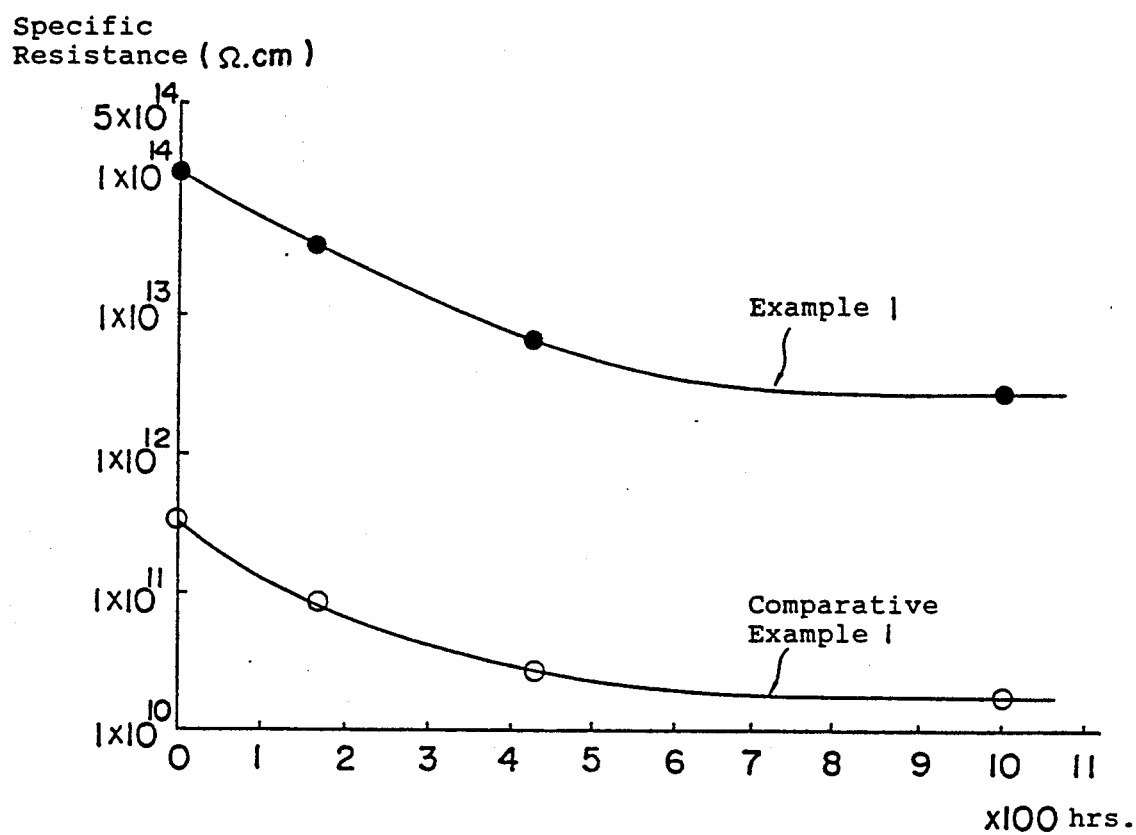

| G ... gate electrode, | S ... source electrode |
| D ... drain electrode, | $C_s$ ... storage capacitance |
| LC ... liquid crystal, | $V_G$ ... scanning signal |
| $V_s$ ... display signal, | $V_c$ ... DC voltage |

FIG. 2 shows current consumption of liquid crystal compositions in Example 1 and Comparative Example 1.

FIG. 3 shows specific resistance.

BEST MODE FOR CARRYING OUT THE INVENTION

Now, the present invention will be described in detail, but the scope of the present invention is not be limited to these examples.

In the present invention, a threshold voltage appropriate voltage-transmittance properties is a voltage at the time when the transmittance of light in an optical axis direction perpendicular to the surface of a display is 10%, and it is represented by $V_{10}$. The current consumption of the liquid crystal is a current which flows between electrodes at 25° C. at the time when a rectangular wave having 3 V and 32 Hz is applied to a glass cell containing a liquid crystal and having a transparent electrode area of 1 cm$^2$ and an electrode gap of 10 μm. In this connection, an initial value of the current is represented by $I_0$ (μA/cm$^2$) and the current after a heating test at 80° C. (1,000 hours) is represented by $I_H$ (μA/cm$^2$). The specific resistance of the liquid crystal is a value obtained by applying a DC voltage of 10 V to a liquid cell (model LE-21) made by Ando Electric Co., Ltd. containing a liquid crystal by the use of a PA meter made by HP Co., Ltd. and a DC voltage source (model HP 4140B), and an initial value of the specific resistance is represented by $\rho_0$ (Ωcm) and the specific resistance after a heating test at 80° C. (1,000 hours) is represented by $\rho_H$ (Ωcm). The liquid crystal for the heating test was stored in an N2 gas atmosphere in a Pyrex glass container at 80° C. The duration of the heating test is usually 1,000 hours, because the results of each sample can reach saturated values in this period of time. In a reliability test of the present invention, light resistance, particularly an ultraviolet light resistance test was omitted because problems attributed to the light resistance have been already solved sufficiently by the improvement of filters for cutting ultraviolet light.

In a comparative example, a cyclohexanebenzonitrile liquid crystal composition which has a positive dielectric anisotropy and which is most reliable in conventional products was used to make comparison with the composition of the present invention. In all the examples inclusive of the comparative example and Example 1, samples were prepared by the same procedure. Each composition ratio is represented in terms of "% by weight".

EXAMPLE 1

A liquid crystal composition was prepared from the following six compounds as compounds represented by the formula (I):

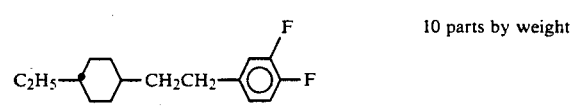

28 parts by weight 6 parts by weight 6 parts by weight 22 parts by weight 8.4 parts by weight 9.6 parts by weight and the following two compounds as compounds having the formula (IV):

10 parts by weight

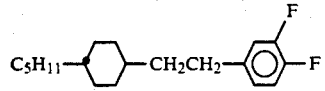 10 parts by weight and characteristics of the prepared composition were then measured. The results are set forth in Table 5.

COMPARATIVE EXAMPLE 1

A liquid crystal composition was prepared from the following four cyclohexanebenzonitrile compounds which were conventional known compounds:

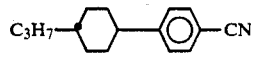 24 parts by weight

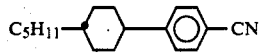 36 parts by weight

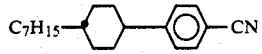 25 parts by weight

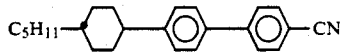 15 parts by weight and characteristics of the prepared composition are set forth in Table 5.

With regard to the liquid crystal compositions in Comparative Example 1 and Example 1, the change of current consumption and specific resistance with time is shown in FIGS. 2 and 3. It is apparent from the results in these figures that the liquid crystal composition of Example 1 consumes a half or less current and has a higher specific resistance of $10^2$ order as compared with that of Comparative Example 1.

EXAMPLE 2

A liquid crystal composition was prepared from the following six compounds represented by the formula (I):

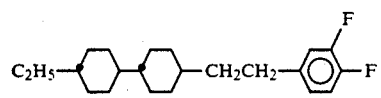 28 parts by weight

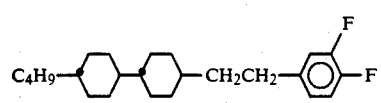 6 parts by weight

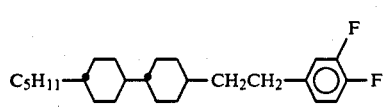 6 parts by weight

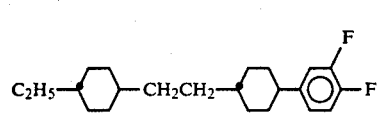 22 parts by weight

 8.4 parts by weight

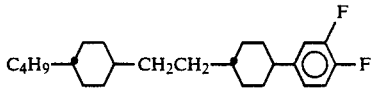 9.6 parts by weight and the following compound as a compound other than those of formulae (I) to (V):

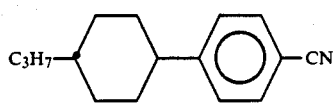 20.0 parts by weight and characteristics of the prepared composition were then measured. The results are set forth in Table 5.

EXAMPLE 3

A liquid crystal composition was prepared from the following three compounds as compounds represented by the formula (I):

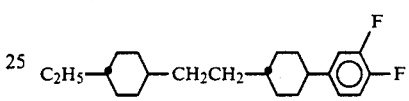 16.5 parts by weight

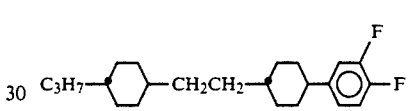 6.3 parts by weight

 7.2 parts by weight the following three compounds as compounds having the formula (II):

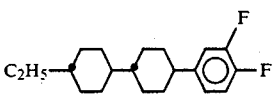 16.7 parts by weight

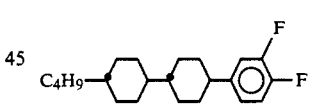 16.7 parts by weight

 16.6 parts by weight and the following four compounds as compounds of the formula (III)

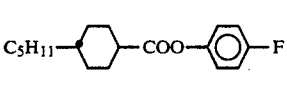 7.5 parts by weight

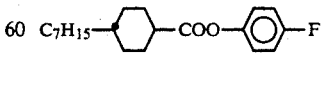 7.5 parts by weight

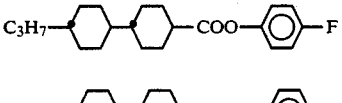 2.5 parts by weight

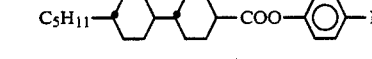 2.5 parts by weight and characteristics of the prepared composition were then measured. The results are set forth in Table 5.

EXAMPLE 4

A liquid crystal composition was prepared from the following three compounds as compounds represented by the formula (I):

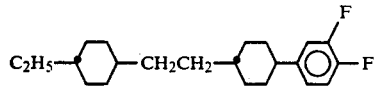 16.5 parts by weight

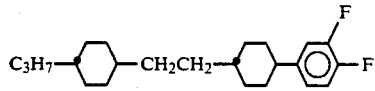 6.3 parts by weight

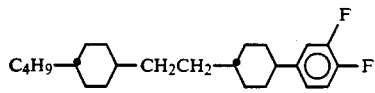 7.2 parts by weight the following three compounds as compounds having the formula (II):

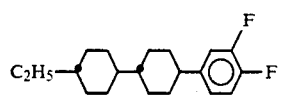 13.4 parts by weight

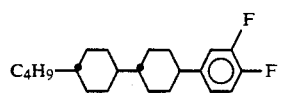 13.3 parts by weight

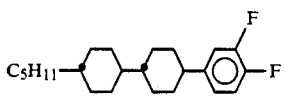 13.3 parts by weight the following compound as a compound of the formula (III)

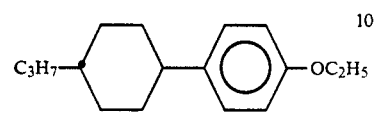 10.0 parts by weight and the following two compounds as compounds other than those of formulae (I) and (III)

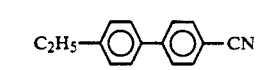 10.0 parts by weight

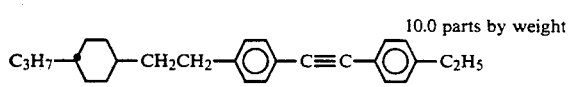 10.0 parts by weight and characteristics of the prepared composition were then measured. The results are set forth in Table 5.

EXAMPLE 5

A liquid crystal composition was prepared from the following three compounds as compounds represented by the formula (I):

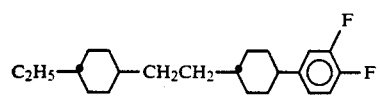 8.3 parts by weight

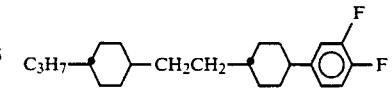 3.1 parts by weight

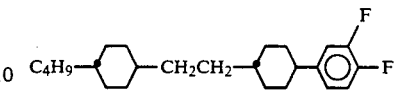 3.6 parts by weight the following three compounds as compounds having the formula (II):

 20.0 parts by weight

 20.0 parts by weight

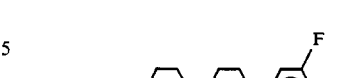 20.0 parts by weight the following three compounds as compounds of the formula (III)

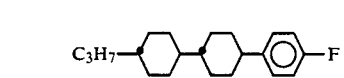 5.0 parts by weight

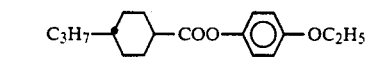 10.0 parts by weight

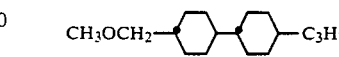 5.0 parts by weight and the following compound as a compound of the formula (IV)

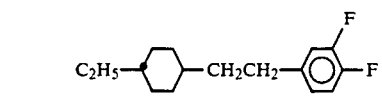 5.0 parts by weight and characteristics of the prepared composition were then measured. The results are set forth in Table 5.

EXAMPLE 6

A liquid crystal composition was prepared form the following three compounds as compounds represented by the formula (I):

 11.0 parts by weight

 4.2 parts by weight

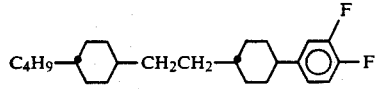 4.8 parts by weight the following three compounds as compounds having the formula (II):

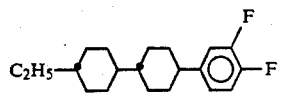 16.7 parts by weight

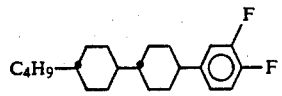 16.7 parts by weight

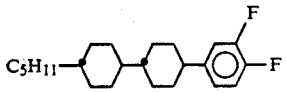 16.7 parts by weight the following two compounds as compounds of the formula (III)

 10.0 parts by weight

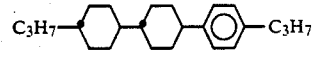 10.0 parts by weight and the following compound as a compound of the formula (IV)

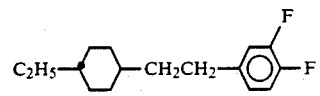 10.0 parts by weight and characteristics of the prepared composition were then measured. The results are set forth in Table 5.

EXAMPLE 7

A liquid crystal composition was prepared from the following three compounds as compounds represented by the formula (I):

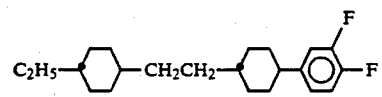 16.5 parts by weight

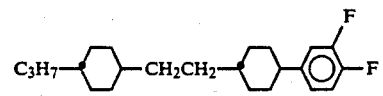 6.3 parts by weight

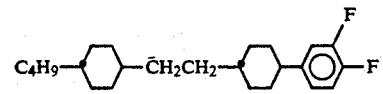 7.2 parts by weight the following three compounds as compounds having the formula (II):

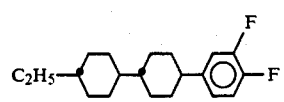 16.7 parts by weight

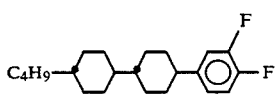 16.7 parts by weight

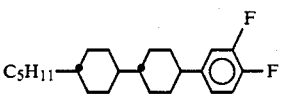 16.7 parts by weight the following compound as a compound of the formula (III)

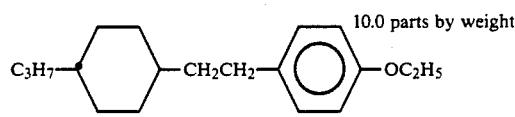 10.0 parts by weight and the following compound as a compound of the formula (V)

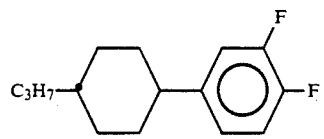 10.0 parts by weight and characteristics of the prepared composition were then measured. The results are set forth in Table 5.

EXAMPLE 8

A liquid crystal composition was prepared form the following three compounds as compounds represented by the formula (I):

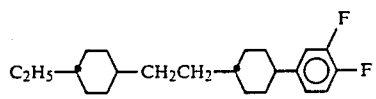 11.0 parts by weight

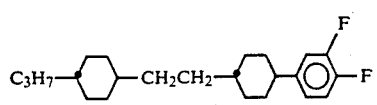 4.2 parts by weight

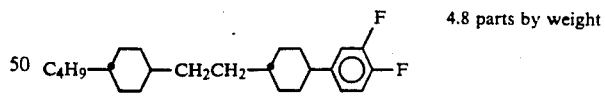 4.8 parts by weight the following three compounds as compounds having the formula (II):

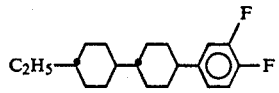 16.7 parts by weight

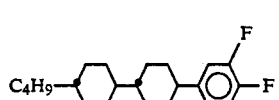 16.7 parts by weight

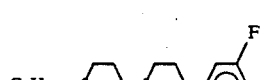 16.6 parts by weight the following two compounds as compounds of the formula (III)

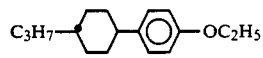 10.0 parts by weight

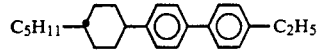 10.0 parts by weight and the following compound as a compound of the formula (V)

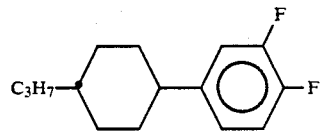 10.0 parts by weight and characteristics of the prepared composition were then measured. The results are set forth in Table 5.

EXAMPLE 9

A liquid crystal composition was prepared form the following three compounds as compounds represented by the formula (I):

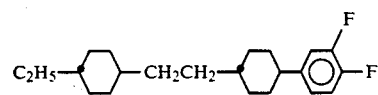 24.7 parts by weight

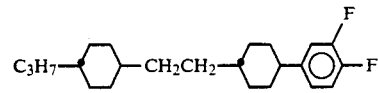 9.5 parts by weight

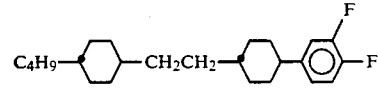 10.8 parts by weight the following three compounds as compounds having the formula (II):

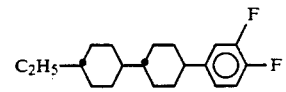 15.0 parts by weight

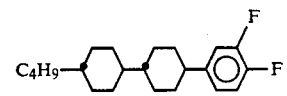 15.0 parts by weight

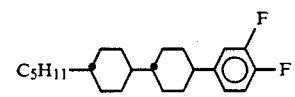 15.0 parts by weight and the following compound as a compound of the formula (IV)

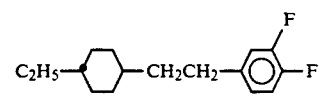 10.0 parts by weight and characteristics of the prepared composition were then measured. The results are set forth in Table 5.

EXAMPLE 10

A liquid crystal composition was prepared from the following five compounds as compounds represented by the formula (I):

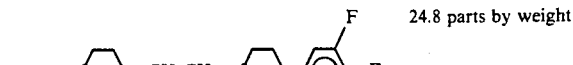 24.8 parts by weight

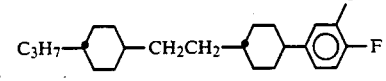 9.4 parts by weight

 10.8 parts by weight

 10.0 parts by weight

 10.0 parts by weight the following three compounds as compounds having the formula (II):

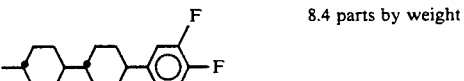 8.4 parts by weight

 8.3 parts by weight

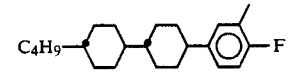 8.3 parts by weight and the following compound as a compound of the formula (IV)

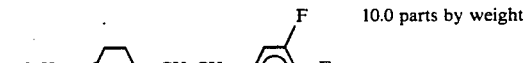 10.0 parts by weight and characteristics of the prepared composition were then measured. The results are set forth in Table 5.

EXAMPLE 11

A liquid crystal composition was prepared from the following three compounds as compounds represented by the formula (I):

 13.8 parts by weight

 5.2 parts by weight

-continued

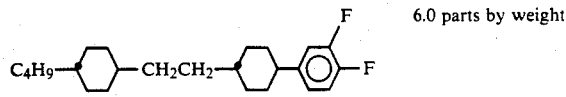 6.0 parts by weight and the following three compounds as compounds having the formula (II):

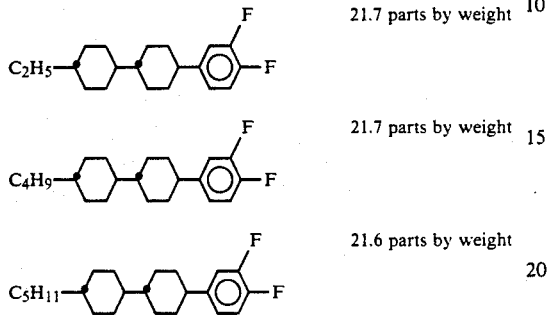

21.7 parts by weight 21.7 parts by weight 21.6 parts by weight and the following compound as a compound having the formula (V):

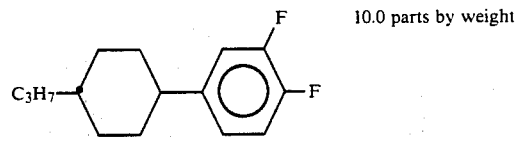 10.0 parts by weight and characteristics of the prepared composition were then measured. The results are set forth in Table 5.

EXAMPLE 12

A liquid crystal composition was prepared form the following four compounds as compounds represented by the formula (I):

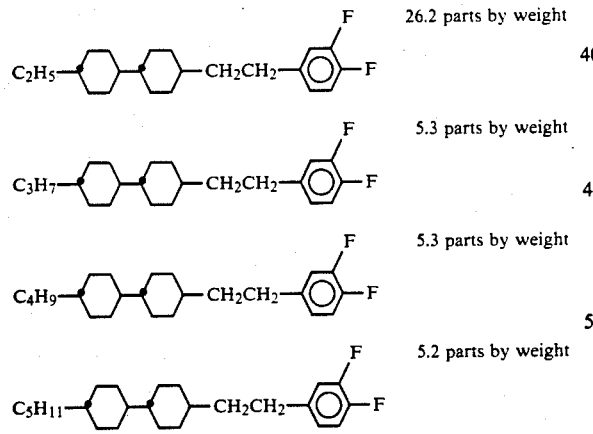

26.2 parts by weight 5.3 parts by weight 5.3 parts by weight 5.2 parts by weight and the following three compounds as compounds having the formula (II):

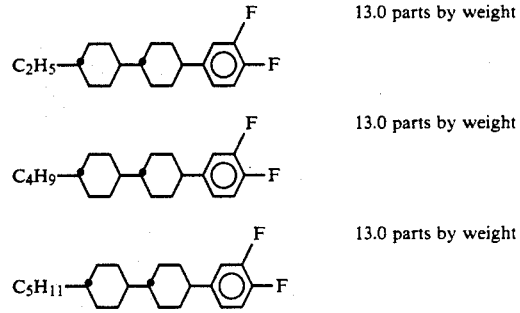

13.0 parts by weight 13.0 parts by weight 13.0 parts by weight and the following two compounds as compounds having the formula (V):

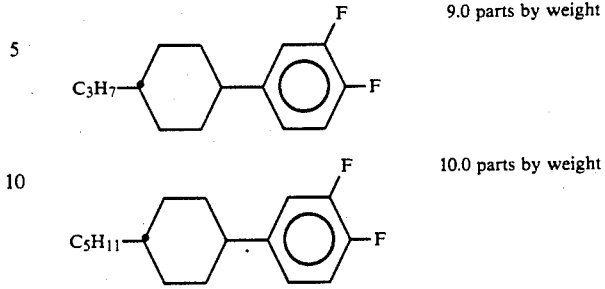

9.0 parts by weight 10.0 parts by weight and characteristics of the prepared composition were then measured. The results are set forth in Table 5.

EXAMPLE 13

A liquid crystal composition was prepared from the following three compounds as compounds represented by the formula (I):

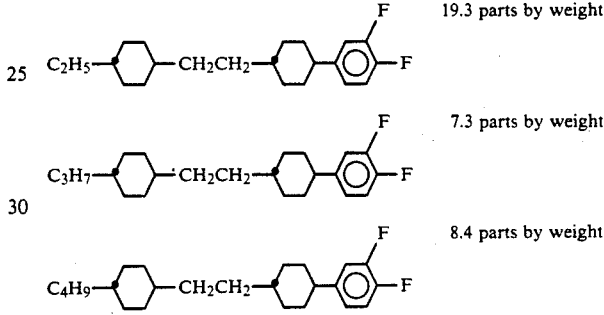

19.3 parts by weight 7.3 parts by weight 8.4 parts by weight and the following three compounds as compounds having the formula (II):

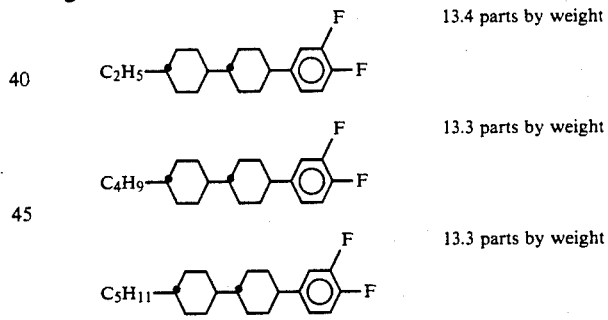

13.4 parts by weight 13.3 parts by weight 13.3 parts by weight the following two compounds as compounds other than those of the formulae (II) and (III):

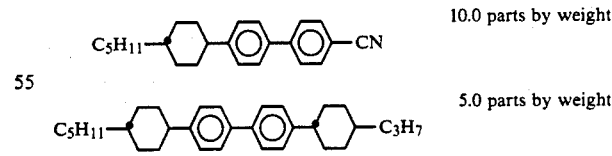

10.0 parts by weight 5.0 parts by weight and the following compound as a compound having the formula (V)

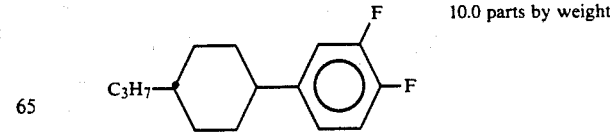 10.0 parts by weight and characteristics of the prepared composition were then measured. The results are set forth in Table 5.

TABLE 5

| | Comparative Example 1 | Example 1 | 2 | 3 | 4 | 5 | 6 |
|---|---|---|---|---|---|---|---|
| Clearing Point NI (°C) | 72.4 | 78.8 | 77.6 | 90.7 | 90.2 | 91.4 | 84.3 |
| Refractive Anisotropy $\Delta n$ | 0.137 | 0.081 | 0.081 | 0.073 | 0.113 | 0.070 | 0.096 |
| Viscosity (20° C.) $\eta_{20}$ (cp) | 27.0 | 26.0 | 26.7 | 24.6 | 21.4 | 21.7 | 20.3 |
| Dielectric Anisotropy $\Delta \epsilon$ | 11.0 | 6.6 | 6.5 | 4.2 | 5.5 | 3.8 | 3.7 |
| Threshold Voltage (25° C.) $V_{10}$ (V) | 1.80 | 1.95 | 1.90 | 2.45 | 2.22 | 2.40 | 2.45 |
| Initial Current $I_0$ ($\mu$A/cm$^2$) | 0.59 | 0.30 | 0.32 | 0.24 | 0.28 | 0.23 | 0.26 |
| Current after Heating $I_H$ ($\mu$A/cm$^2$) | 1.04 | 0.34 | 0.40 | 0.26 | 0.30 | 0.24 | 0.28 |
| Initial Specific Resistance $\rho_0$ ($\Omega$cm) | $5.0 \times 10^{11}$ | $1.6 \times 10^{14}$ | $4.3 \times 10^{13}$ | $9.4 \times 10^{13}$ | $2.0 \times 10^{14}$ | $5.0 \times 10^{13}$ | $3.1 \times 10^{13}$ |
| Specific Resistance after Heating $\rho_H$ ($\Omega$cm) | $2.0 \times 10^{10}$ | $4.1 \times 10^{12}$ | $7.5 \times 10^{10}$ | $3.2 \times 10^{12}$ | $1.0 \times 10^{11}$ | $2.0 \times 10^{12}$ | $1.6 \times 10^{12}$ |

| | Example 7 | 8 | 9 | 10 | 11 | 12 | 13 |
|---|---|---|---|---|---|---|---|
| Clearing Point NI (°C) | 64.6 | 81.0 | 76.2 | 74.3 | 83.3 | 65.9 | 99.7 |
| Refractive Anisotropy $\Delta n$ | 0.068 | 0.083 | 0.071 | 0.082 | 0.072 | 0.065 | 0.092 |
| Viscosity (20° C.) $\eta_{20}$ (cp) | 18.9 | 16.2 | 23.0 | 23.8 | 22.0 | 19.8 | 26.5 |
| Dielectric Anisotropy $\Delta \epsilon$ | 3.9 | 3.6 | 4.5 | 4.5 | 4.6 | 4.1 | 5.6 |
| Threshold Voltage (25° C.) $V_{10}$ (V) | 2.10 | 2.38 | 2.10 | 2.16 | 2.06 | 1.96 | 2.23 |
| Initial Current $I_0$ ($\mu$A/cm$^2$) | 0.24 | 0.22 | 0.29 | 0.23 | 0.26 | 0.27 | 0.28 |
| Current after Heating $I_H$ ($\mu$A/cm$^2$) | 0.27 | 0.23 | 0.39 | 0.26 | 0.30 | 0.36 | 0.30 |
| Initial Specific Resistance $\rho_0$ ($\Omega$cm) | $1.2 \times 10^{14}$ | $5.8 \times 10^{13}$ | $4.6 \times 10^{13}$ | $2.1 \times 10^{13}$ | $2.3 \times 10^{14}$ | $3.8 \times 10^{13}$ | $1.2 \times 10^{14}$ |
| Specific Resistance after Heating $\rho_H$ ($\Omega$cm) | $1.0 \times 10^{12}$ | $1.8 \times 10^{12}$ | $2.0 \times 10^{12}$ | $5.1 \times 10^{12}$ | $4.0 \times 10^{12}$ | $1.5 \times 10^{12}$ | $2.7 \times 10^{11}$ |

EXAMPLE 14

A liquid crystal composition was prepared from the following two compounds as compounds represented by the formula (I):

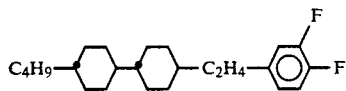
28.0 parts by weight

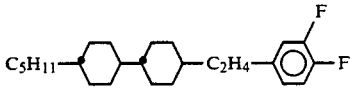
12.0 parts by weight and the following three compounds as compounds having the formula (II):

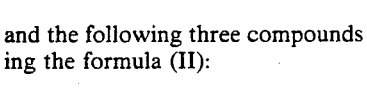
15.0 parts by weight

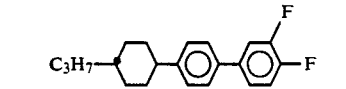
15.0 parts by weight

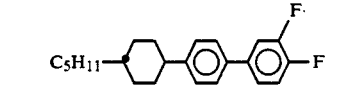
30.0 parts by weight and characteristics of the prepared composition were then measured. The results are set forth in Table 6.

EXAMPLE 15

A liquid crystal composition was prepared from the following eight compounds as compounds represented by the formula (I):

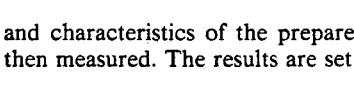
14.0 parts by weight

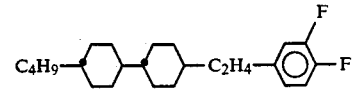
6.0 parts by weight

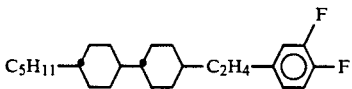
8.0 parts by weight

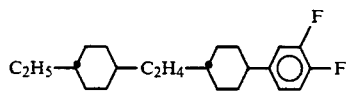
4.0 parts by weight

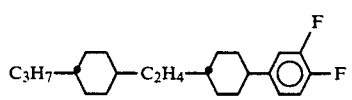
8.0 parts by weight

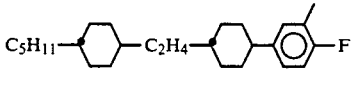
7.4 parts by weight

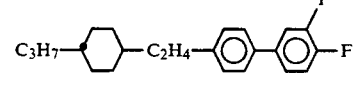
8.8 parts by weight

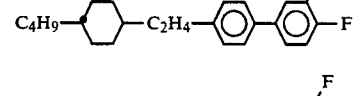
3.8 parts by weight the following three compounds as compounds having the formula (II):

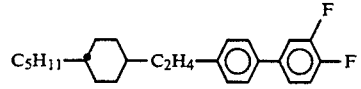
7.5 parts by weight

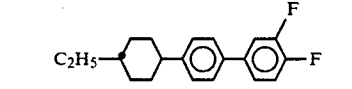
7.5 parts by weight

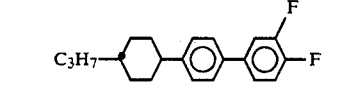

-continued

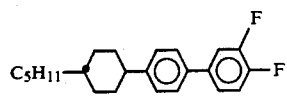 15.0 parts by weight and the following two compounds as compounds having the formula (V):

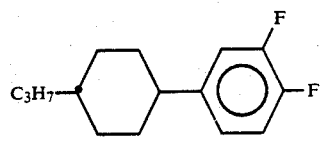 5.0 parts by weight

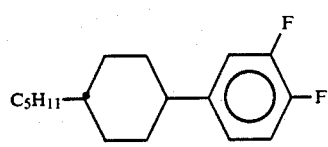 5.0 parts by weight and characteristics of the prepared composition were then measured. The results are set forth in Table 6.

EXAMPLE 16

A liquid crystal composition was prepared form the following six compounds as compounds represented by the formula (I):

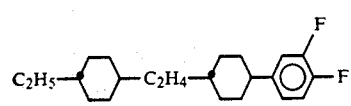 8.0 parts by weight

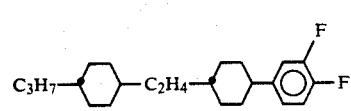 4.0 parts by weight

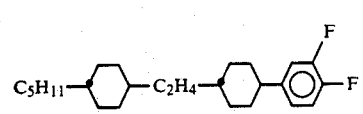 8.0 parts by weight

 4.0 parts by weight

 4.0 parts by weight

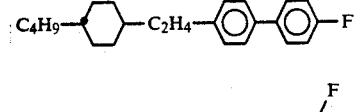 2.0 parts by weight the following three compounds as compounds having the formula (II):

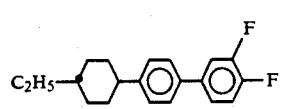 10.0 parts by weight

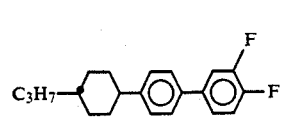 10.0 parts by weight

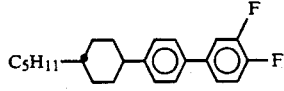 20.0 parts by weight the following compound as a compound having the formula (III):

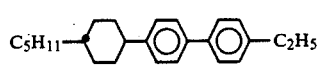 10.0 parts by weight the following compound as a compound having the formula (IV):

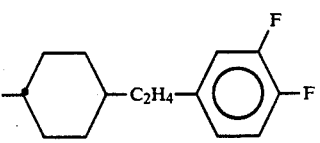 10.0 parts by weight and the following compound as a compound having the formula (V):

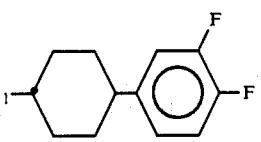 10.0 parts by weight and characteristics of the prepared composition were then measured. The results are set forth in Table 6.

EXAMPLE 17

A liquid crystal composition was prepared form the following three compounds as compounds represented by the formula (I):

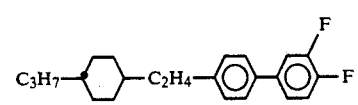 11.1 parts by weight

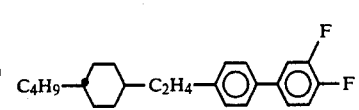 13.2 parts by weight

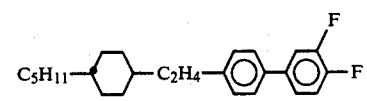 5.7 parts by weight the following six compounds as compounds having the formula (II):

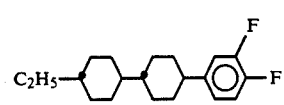 10.0 parts by weight

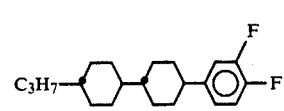 10.0 parts by weight

-continued

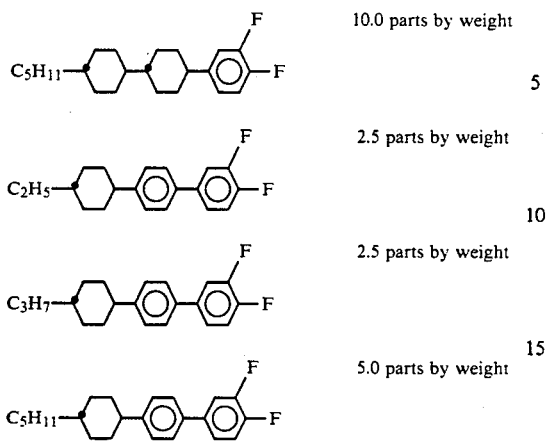

10.0 parts by weight 2.5 parts by weight 2.5 parts by weight 5.0 parts by weight the following compound as a compound having the formula (III):

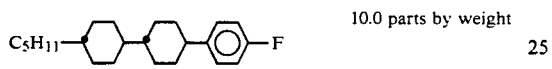

10.0 parts by weight the following compound as a compound having the formula (IV):

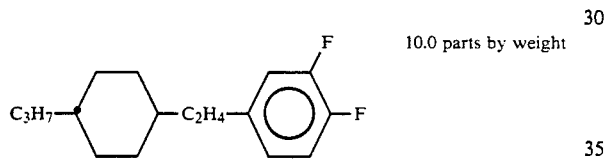

10.0 parts by weight and the following compound as another compound:

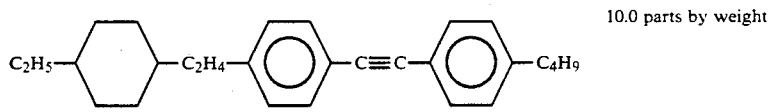

10.0 parts by weight and characteristics of the prepared composition were then measured. The results are set forth in Table 6.

TABLE 6

|  | Example | | | |
| --- | --- | --- | --- | --- |
|  | 14 | 15 | 16 | 17 |
| Clearing Point NI (°C) | 98.9 | 75.5 | 63.5 | 89.5 |
| Refractive Anisotropy $\Delta n$ | 0.099 | 0.117 | 0.103 | 0.114 |
| Viscosity (20° C.) $\eta_{20}$ (cp) | 28.5 | 24.4 | 23.0 | 21.5 |
| Dielectric Anisotropy $\Delta \epsilon$ | 5.3 | 4.8 | 4.3 | 4.3 |
| Threshold Voltage (25° C.) $V_{10}$ (V) | 2.55 | 2.22 | 2.24 | 2.77 |
| Initial Current $I_0$ ($\mu A/cm^2$) | 0.28 | 0.30 | 0.27 | 0.25 |
| Current after Heating $I_H$ ($\mu A/cm^2$) | 0.30 | 0.31 | 0.30 | 0.26 |
| Initial Specific Resistance $\rho_0$ ($\Omega cm$) | $3.5 \times 10^{13}$ | $3.1 \times 10^{13}$ | $7.8 \times 10^{13}$ | $1.1 \times 10^{14}$ |
| Specific Resistance after Heating $\rho_H$ ($\Omega cm$) | $1.4 \times 10^{11}$ | $1.4 \times 10^{11}$ | $1.7 \times 10^{11}$ | $2.0 \times 10^{11}$ |

INDUSTRIAL APPLICABILITY

The effects of the present invention are to enhance the reliability of low current consumption and high specific resistance of a liquid crystal composition used in liquid crystal display elements inclusive of a passive mode and an active matrix mode, to improve the reliability of the liquid crystal element using the liquid crystal composition, and to improve the display contrast of the liquid crystal element As understood by mutually comparing the results of Example 1 and Comparative Example 1 shown in FIGS. 2 and 3, and as indicated by the results of Tables 5 and 6, the liquid crystal compositions of the present invention remarkably improve characteristics such as current consumption, the initial value of the specific resistance and the value after a heating test of conventional liquid crystal compositions. It can be considered that the compounds represented by the formulae (I), (II), (III), (IV) and (V), particularly the compounds of the formula (I) contribute largely to the above-mentioned improvement. Furthermore, when the compounds having the formulae (I), (II), (III), (IV) and (V) are mixed as the main components, the liquid crystal composition having properties suitable for the practice of the display elements, for example, a proper clearing point and threshold voltage as well as a low viscosity can be obtained.

The liquid crystal composition of the present invention has such properties as described above, and therefore the employment of this liquid crystal composition permits heightening the reliability of the liquid crystal composition and the liquid crystal element using this composition inclusive of the passive mode and the active matrix mode, and improving the display contrast of the element.

We claim:

1. A liquid crystal composition which comprises, as main components, 15 to 80 parts by weight of at least one compound represented by the formula (I)

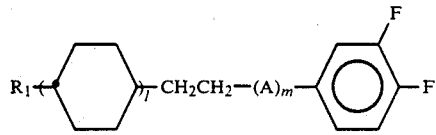

and 25 to 65 parts by weight of at least one compound represented by the formula (II)

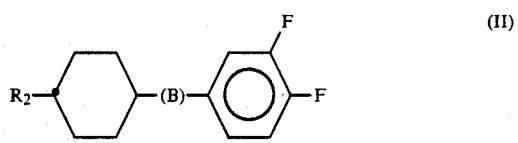

wherein $R_1$ is an alkyl group having 1 to 10 carbon atoms, $R_2$ is an alkyl group having 1 to 10 carbon atoms, l is an integer of 1 or 2, m is an integer of 0 or 1, but $1+m=2$, and A and B are independently

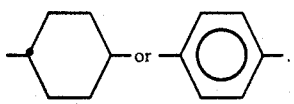

2. A liquid crystal composition according to claim 1 which comprises at least one compound represented by the following formula

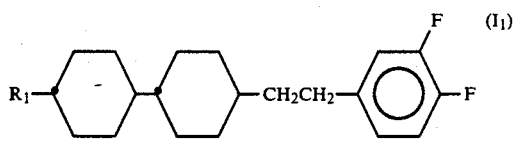

or

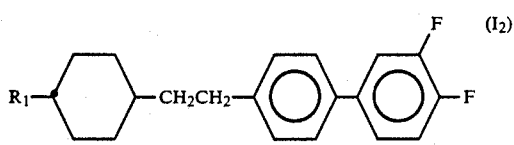

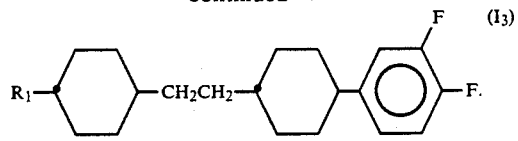

3. A liquid crystal composition according to claim 1 which comprises 5 to 30% by weight of at least one compound represented by the formula (IV)

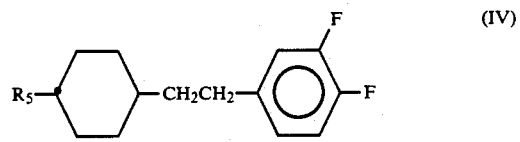

(wherein $R_5$ is an alkyl group having 1 to 10 carbon atoms), and/or at least one compound represented by the formula (V)

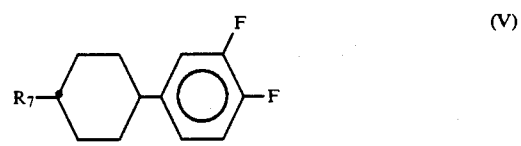

(wherein $R_7$ is an alkyl group having 1 to 10 carbon atoms).

4. A liquid crystal element which contains the liquid crystal composition described in claim 1.

5. A liquid crystal element which contains the liquid crystal composition described in claim 3.

6. A liquid crystal composition which comprises 15 to 80 parts by weight of at least one compound represented by the formula (I)

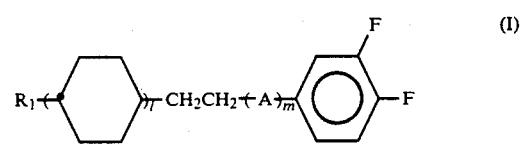

(wherein $R_1$ is an alkyl group having 1 to 10 carbon atoms, l is an integer of 1 or 2, m is an integer of 0 or 1, but $1+m=2$, and A is

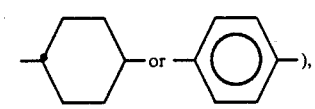

not more than 65 parts by weight of at least one compound represented by the formula (II)

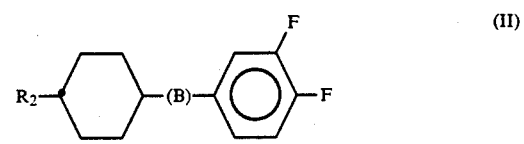

(wherein $R_2$ is an alkyl group having 1 to 10 carbon atoms, and B is or

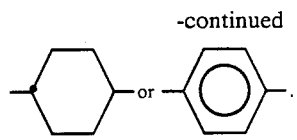

and not more than 40 parts by weight of at least one compound represented by the formula (III)

$$R_3-(C)_p-X-(D)_q-R_4 \quad (III)$$

(wherein $R_3$ is an alkyl group having 1 to 10 carbon atoms or an alkoxymethyl group having 2 to 10 carbon atoms, $R_4$ is an alkyl group or an alkoxy group having 1 to 10 carbon atoms or F, each of p and q is an integer of 1 or 2, but $p+q \leq 3$, each of C and D are independently

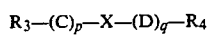

and X is a single bond, $-CH_2CH_2-$, $-COO-$ or $-C\equiv C-$), the total amount of the compounds having the formulae (I), (II) and (III) being not less than 60% by weight.

7. A liquid crystal composition according to claim 6 which comprises at least one compound represented by the following formula

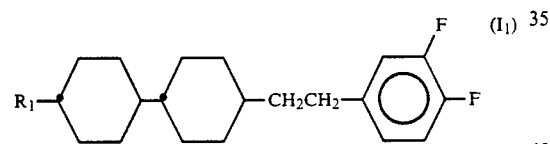

(I₁)

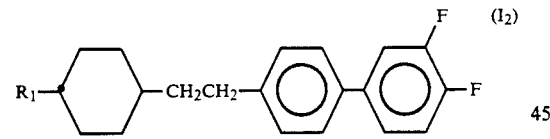

(I₂)

or

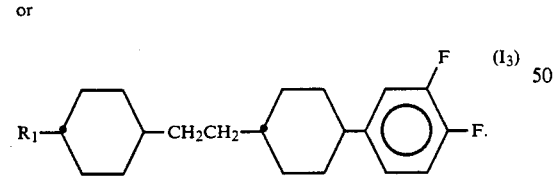

(I₃)

8. A liquid crystal composition according to claim 6 which comprises 15 to 80 parts by weight of at least one compound represented by the formula (I)

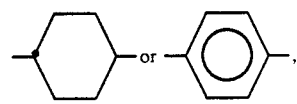

(I)

25 to 65 parts by weight of at least one compound represented by the formula (II)

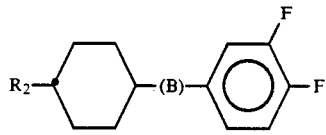

(II)

and 10 to 40 parts by weight of at least one compound represented by the formula (III)

$$R_3-(C)_p-X-(D)_q-R_4 \quad (III)$$

the total amount of said compounds having said formulae (I), (II) and (III) being not less than 60% by weight.

9. A liquid crystal composition according to claim 8 which comprises at least one compound represented by the following formula

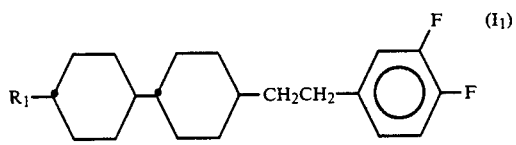

(I₁)

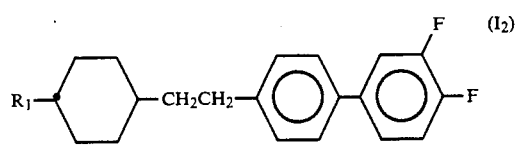

(I₂)

or

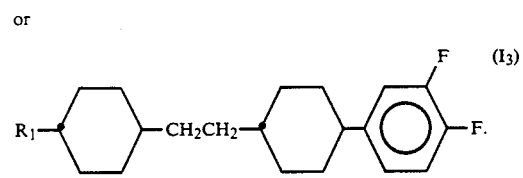

(I₃)

10. A liquid crystal composition according to claim 6, which comprises 5 to 30% by weight of at least one compound represented by the formula (IV)

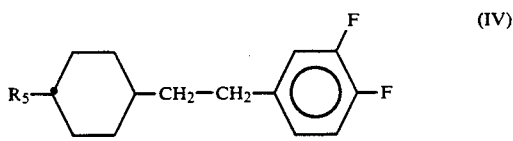

(IV)

wherein $R_5$ is an alkyl group having 1 to 10 carbon atoms, and/or at least one compound represented by the formula (V)

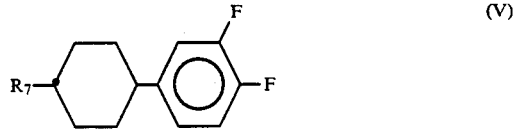

(V)

wherein $R_7$ is an alkyl group having 1 to 10 carbon atoms.

11. A liquid crystal composition according to claim 8, which comprises 5 to 30% by weight of at least one compound represented by the formula (IV)

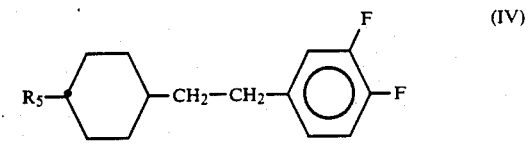

wherein $R_5$ is an alkyl group having 1 to 10 carbon atoms, and/or at least ;one compound represented by the formula (V)

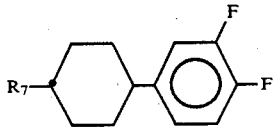

wherein $R_7$ is an alkyl group having 1 to 10 carbon atoms.

12. A liquid crystal element which contains the liquid crystal composition described in claim 6.

13. A liquid crystal element which contains the liquid crystal composition described in claim 8.

14. A liquid crystal element which contains the liquid crystal composition described in claim 10.

15. A liquid crystal element which contains the liquid crystal composition described in claim 11.

* * * * *